(12) United States Patent
Rodrigues et al.

(10) Patent No.: US 7,094,972 B2
(45) Date of Patent: Aug. 22, 2006

(54) INSULATING COVER FOR ELECTRICAL CONNECTORS

(75) Inventors: Julio F. Rodrigues, Collierville, TN (US); Ronald L. Jackson, Boise, ID (US); Ed Jacobs, Germantown, TN (US)

(73) Assignee: Thomas & Betts International, Inc., Wilmington, DE (US)

( * ) Notice: Subject to any disclaimer, the term of this patent is extended or adjusted under 35 U.S.C. 154(b) by 0 days.

(21) Appl. No.: 11/159,495

(22) Filed: Jun. 23, 2005

(65) Prior Publication Data

US 2006/0011372 A1 Jan. 19, 2006

Related U.S. Application Data

(60) Provisional application No. 60/587,607, filed on Jul. 13, 2004, provisional application No. 60/619,634, filed on Oct. 18, 2004.

(51) Int. Cl.
*H02G 3/06* (2006.01)

(52) U.S. Cl. ............................ 174/93; 174/92; 174/91; 174/21 R; 174/74 R

(58) Field of Classification Search .................. 174/93, 174/92, 91, 21 R, 74 R; 156/49, 48; 439/369
See application file for complete search history.

(56) References Cited

U.S. PATENT DOCUMENTS

| | | | |
|---|---|---|---|
| 3,183,302 A | 5/1965 | Wochner et al. | |
| 3,223,776 A | 12/1965 | Piasecki | |
| 3,325,591 A | 6/1967 | Wahl | |
| 3,836,694 A | 9/1974 | Kapell | |
| 3,879,574 A * | 4/1975 | Filreis et al. ................ | 174/76 |
| 3,992,569 A | 11/1976 | Hankins et al. | |
| 4,084,067 A | 4/1978 | Gillemot | |
| 4,169,966 A | 10/1979 | Casati | |
| 4,647,719 A | 3/1987 | Campbell et al. | |
| 4,778,948 A | 10/1988 | Fitch et al. | |
| 4,933,512 A | 6/1990 | Nimiya et al. | |
| 4,985,598 A | 1/1991 | Bubica et al. | |
| 5,099,088 A | 3/1992 | Usami et al. | |
| 5,247,135 A | 9/1993 | Rebers et al. | |
| 5,251,373 A | 10/1993 | DeCarlo et al. | |
| 5,266,742 A | 11/1993 | Heier et al. | |
| 5,382,756 A | 1/1995 | Dagan | |
| 5,645,456 A | 7/1997 | Petersen et al. | |
| 5,802,715 A | 9/1998 | O'Neill | |
| 5,862,290 A | 1/1999 | Burek et al. | |
| 5,883,999 A | 3/1999 | Cloud et al. | |
| 5,912,433 A * | 6/1999 | Pulido et al. ............. | 174/77 R |
| 5,962,811 A | 10/1999 | Rodrigues et al. | |
| 6,111,201 A | 8/2000 | Drane et al. | |
| 6,169,250 B1 | 1/2001 | Bolcato | |
| 6,218,618 B1 * | 4/2001 | O'Neill et al. ................ | 174/76 |
| 6,344,615 B1 | 2/2002 | Nolf et al. | |

\* cited by examiner

*Primary Examiner*—Jinhee Lee
(74) *Attorney, Agent, or Firm*—Hoffmann & Baron, LLP

(57) ABSTRACT

An insulated cover for electrical connectors which includes a transparent housing having a top section and a bottom section, a pair of opposing end walls and a plurality of flexible fingers extending inwardly from the periphery of an aperture in each end wall, which is formed when the top section and bottom section are joined together. The fingers have a plurality of transverse grooves which increase the flexibility of the fingers as they contact the electrical conductors entering the housing. The depth of the grooves increases towards their terminus to increase their flexibility.

11 Claims, 4 Drawing Sheets

INSULATING COVER FOR ELECTRICAL CONNECTORS

The present application claims priority based on U.S. Provisional Application Ser. No. 60/587,607, filed on Jul. 13, 2004, and U.S. Provisional Application Ser. No. 60/619,634, filed on Oct. 18, 2004, which are hereby incorporated by reference in their entirety.

FIELD OF THE INVENTION

The present invention relates generally to an insulating cover for electrical connectors wherein electrical conductors are connected together. More particularly, the present invention relates to a method and apparatus for insulating and visually monitoring an electrical connector and improved fingers for contacting the cables.

BACKGROUND OF INVENTION

Electrical connectors are often used to join together two sections of electrical cable, for example, connections to motors from a motor control center. When connecting two sections of electrical cable, the metal shield and outer protective sheath must be removed to expose the underlying conductor. A connector is installed on the end of each cable that is to be joined and the connectors are then mated to complete the installation. Typically, the connectors are not insulated and require a cover to prevent grounding or injury to personnel.

Many techniques are currently known for covering cable connectors. Wire splice closures have been used to protect multi-conductor cable connections. Typically, a wire splice closure includes an enclosure filled with an encapsulant that fully surrounds and seals the splice. The encapsulants are usually provided in a fluid state and are poured into the enclosure after the enclosure has been fitted over the cable splice. The encapsulant may be forced into the enclosure under pressure so that the encapsulant fully surrounds the cable splice and fills the interstices between conductors. The encapsulant then cures to a gel-like consistency to effectively seal the splice and isolate it from the surrounding environment.

Various other prior art insulating covers and closures exist for housing and protecting spliced wires and cable connectors. A first group of prior art closures are formed with separate top and bottom portions. Two-piece closures are oftentimes less convenient to use in the field, and are less convenient to manufacture. Moreover, a typical two-piece closure is assembled by installing one part directly on top of the other part. As will be appreciated by those skilled in the art, this type of assembly may require the application of significantly large forces to the respective halves of the closure, thus making installation more difficult. Another group of prior art closures are formed as one-piece components. The two halves of the closure are pivotable with respect to one another about a hinge until such halves contact one another to complete the closure.

Other cable splice covers and enclosures include two half-shells which form the upper and lower sections of the splice enclosure. Examples of this type of enclosure are shown in U.S. Pat. Nos. 4,550,965 and 4,423,918. Still other cable splice enclosures are known which include two-part enclosure housings which are assembled around the splice. Examples of this type of enclosure are shown in U.S. Pat. Nos. 3,138,657; 3,992,569 and 4,554,401.

In order to isolate the interior, the ends of the enclosure must be sealed. End seals generally fall into two categories. The first type of end seals which may be used in combination with splice enclosures are rigid end seals. These end seals are clamped in sealed fashion to spaced apart locations on the cable on either side of the splice. The splice enclosure is then sealably secured to the end seals at each end thereof. Rigid end seals of this type provide an effective technique for sealably closing the opposed ends of a splice enclosure so as to resist moisture intrusion. An example of rigid end seals used in combination with a cable splice enclosure is shown in U.S. Pat. Nos. 5,245,133 and 5,251,373. While extremely effective, these rigid end seals are multi-component devices requiring time-consuming and skilled installation.

A second approach is to employ sealing collars or dams about the cable on either side of the splice. Each sealing dam may be formed, for example, by wrapping mastic tape around the cable to form a buildup of mastic about which the ends of the enclosure may be positioned. The mastic provides good sealing contact with the cable as well as with the enclosure. The mastic tape, while sufficiently viscous to permit wrapping and positioning about the cable, does exhibit some degree of flow. While this permits good compressive engagement to be made, it does make securing the cover around the dams more difficult. The enclosure is typically secured by applying a compression strap around the enclosure about the sealing dams as well as at other locations. However, compression of the straps may tend to cause movement of the mastic tape. In order to prevent this tendency, the user must secure the sealing dams to the ends of the enclosure. This is typically accomplished by wrapping the ends of the enclosure and the cable adjacent the sealing dams with a sealing tape. As can be appreciated, this requires additional steps as well as additional materials which must be available to the installer. Furthermore, the integrity of such a tape-wrapped assembly is extremely craft-sensitive and is difficult to construct for longer cable splice extents.

It is therefore desirable to provide an insulated cover for an electrical connector, which can be easily applied and which provides an adequate seal to prevent dirt from coming in contact with the connector.

SUMMARY OF THE INVENTION

In accordance with the present invention, an insulated cover for an electrical connector for protecting a cable connector is provided. As used herein, the term "insulated cover" refers to an enclosure which both electrically and environmentally isolates an electrical connector. The insulated cover includes: a housing which can be transparent and which has a pair of opposing end walls; a first aperture and a second aperture in the opposing end walls, wherein each aperture has a periphery; a plurality of flexible fingers extending inwardly from the periphery of each aperture; and a plurality of transverse grooves on the fingers, which increase the flexibility of the fingers. The grooves increase in depth as they approach the ends of the fingers. In another embodiment, instead of the grooves increasing in depth, the thickness of each finger decreases as it approaches the end. Preferably, one of the fingers extending from each aperture includes a plug at its end.

The housing of the insulated cover can also include at least one side wall having an interior side with a label slot which is adapted to receive an identification label. In another embodiment, the housing also includes at least one side wall having an exterior side with at least one cable tie slot which is adapted to receive a cable tie. The housing is preferably formed from a material comprising a polycarbonate. However, other transparent materials can be used including an elastic synthetic polyamide material (Nylon), an acrylonitrile-butadiene styrene, a polyester terephthalate, a styrene-acrylonitrile or a thermoplastic material such as polyethylene, polypropylene or polybutylene.

In another embodiment, the insulated cover includes: a transparent housing which has an interior surface and an exterior surface and includes a top section and a bottom section. The top section has a top wall, a pair of opposing top side walls and a pair of opposing top end walls and the bottom section has a bottom wall, a pair of opposing bottom side walls and a pair of opposing bottom end walls. The corresponding top and bottom opposing end walls form an aperture when the top and bottom sections are joined together. The housing also includes a plurality of flexible fingers extending inwardly from the periphery of each aperture. Each finger terminates at an end and has a plurality of transverse grooves. The grooves in the fingers increase in depth as they approach the end of the fingers and thereby increase the flexibility of the fingers. Preferably, one of the fingers extending from each aperture includes a plug at its end.

In still another embodiment, the insulated cover includes: a transparent housing having a top section and a bottom section, which form an interior space when joined together. The top section has a top wall, a pair of opposing top side walls and a pair of opposing top end walls and the bottom section has a bottom wall, a pair of opposing bottom side walls and a pair of opposing bottom end walls. A first aperture and a second aperture are formed in the opposing end walls when the top section and the bottom section are joined together. Each aperture has a periphery from which a plurality of flexible fingers extend inwardly. Each finger terminates at an end and decreases in thickness as it approaches the end. The fingers also have a plurality of transverse grooves, which increase in depth as they approach the end of the fingers and increase the flexibility of the fingers. A plug is formed at the terminus of one of the fingers.

In addition, the housing includes a label slot on the interior side of one of the side walls, wherein the slot is adapted to receive an identification label, and at least one cable tie slot on the side wall of the top section or the bottom section is adapted to receive a cable tie. The housing is preferably formed from a material comprising a polycarbonate. However, other materials can be used including an elastic synthetic polyamide material (Nylon), an acrylonitrile-butadiene styrene, a polyester terephthalate, a styrene-acrylonitrile or a thermoplastic material such as polyethylene, polypropylene or polybutylene.

The preferred embodiments of the outlet box of the present invention, as well as other objects, features and advantages of this invention, will be apparent from the following detailed description, which is to be read in conjunction with the accompanying drawings.

BRIEF DESCRIPTION OF THE FIGURES

Other objects and many attendant features of this invention will be readily appreciated as the invention becomes better understood by reference to the following detailed description when considered in connection with the accompanying drawings wherein.

DETAILED DESCRIPTION OF THE INVENTION

Figure 1:
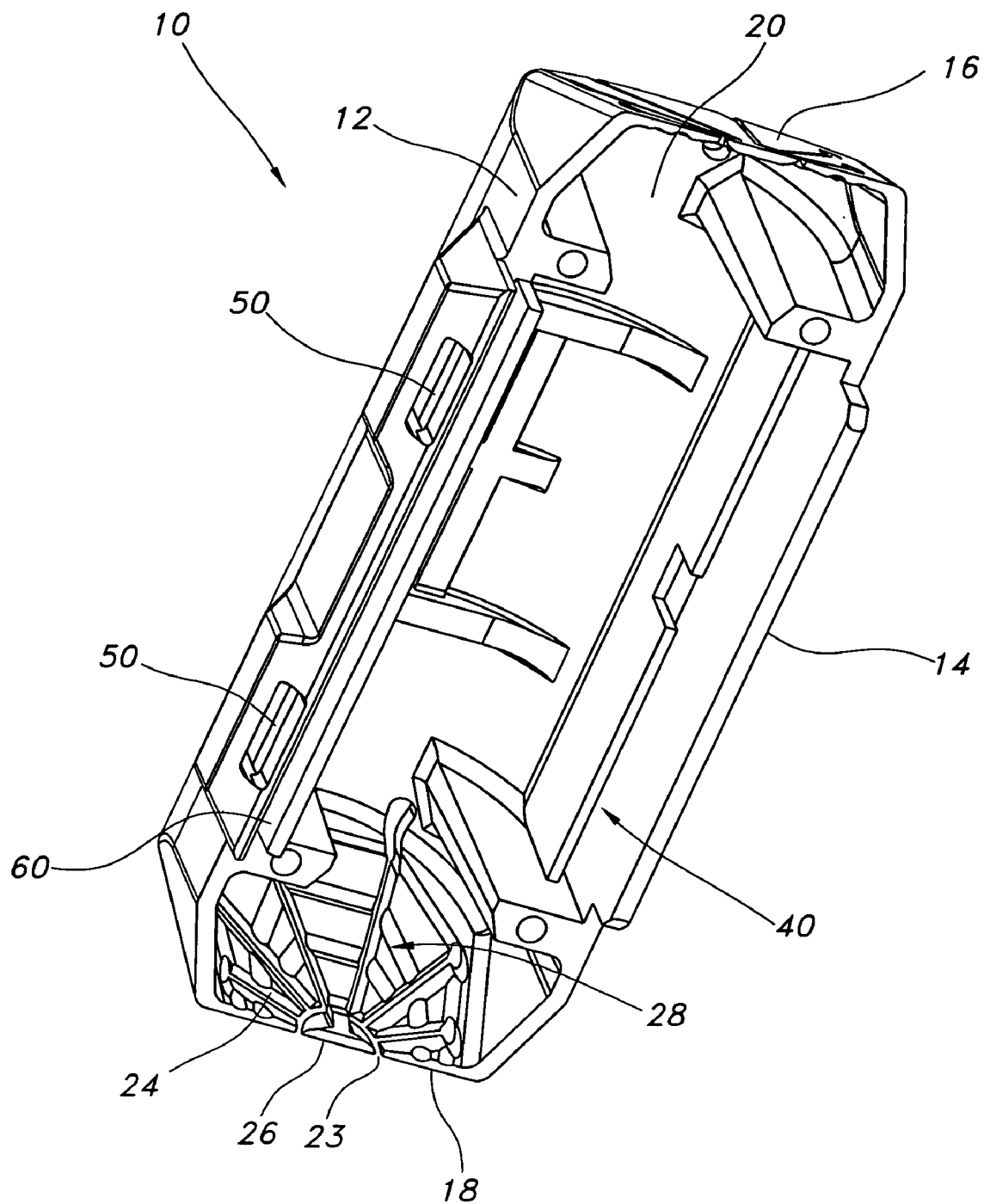
FIG. 1 is a view of the interior of a top/bottom section of the insulated cover of the present invention.

The present invention is an insulated cover for electrical connections that allows connections to be visually examined without opening the insulated cover. For the purposes of the present invention, the term insulated cover is used interchangeably with the terms enclosure and cover. The insulated cover includes a transparent housing with at least two apertures in the housing for electrical conductors. The exterior of the housing has at least one slotted member extending outwardly from the surface of the housing for receiving a cable tie. The cable tie extends around the latitudinal perimeter of the housing to secure the housing in a closed position.

Insulated cover for protecting electrical connections are well known. Examples of such closures are disclosed in U.S. Pat. Nos. 4,732,628; 5,802,715; 6,111,201; and 6,218,618. All of which are incorporated herein in their entirety by reference. The insulated cover for connectors electrically isolate and protect the connectors inside the closure from the surrounding environment.

The insulated cover of the present invention can be used for a wire splice or a variety of different electrical connectors, preferably crimped H tap connectors. In a preferred embodiment, the insulated cover is provided with a clear plastic body material which allows visual inspection of the connector through the clear plastic.

The insulated cover includes a housing with a top section and a bottom section that are sealably fitted together. The top section is a box-like structure that has walls on five sides and includes opposing top side walls, a top wall and opposing top end walls. The opposing top side walls and the opposing top end walls extend downwardly from the top wall and form a continuous top section edge. The bottom section is a box like structure that has walls on five sides and includes opposing bottom side walls, a bottom wall and opposing bottom end walls. The opposing bottom side walls and the opposing bottom end walls extend upwardly from the bottom wall and form a continuous bottom section edge. In one embodiment, the top and bottom sections have identical structures. However, the invention also includes top (or bottom) sections with a curved top wall and no side walls and top/bottom sections with a plurality of top/side walls.

In a preferred embodiment, the top and bottom section are pivotably connected at the edge of one of the opposing top side walls and the edge of one of the opposing bottom side walls. In another preferred embodiment, at least one of the side walls of the top section and the bottom section are sealably fitted together using a tongue and groove construction along the edges of the side walls, wherein one of the side walls has a raised surface that is received by a recessed portion of the corresponding side wall of the other section.

When the top section and the bottom section of the closure housing are joined together, the top end walls and the bottom end walls provide openings (also referred to herein as apertures) for the passage of electrical conductors. In a preferred embodiment, both the top end walls and the bottom end walls have a plurality of flexible fingers which extend inwardly from the periphery of each aperture to a semi-circular plug which can be removable. The plug allows the termination of the fingers to form rounded edges. In contrast, the flexible fingers of insulated covers currently in use terminate at a single point with sharp tips in order to minimize openings into the closure. This helps keep out dirt and contaminants. However, the sharp ends of the fingers require care during installation to avoid cuts and scrapes. The insulated cover design of the present invention solves this problem by including a semi circular plug at the tip of one of the fingers (see FIG. 2). This allows the tips of the other fingers to be substantially flat and reduces the chance of injury.

The insulated cover is made of transparent material so that the connection inside the cover can be periodically inspected without opening the cover. The insulated cover material is a clear, impact resistant material preferably a polycarbonate material. However, other non-electrically conductive materials can be used including an elastic synthetic polyamide material (Nylon), an acrylonitrile-butadiene styrene, a polyester terephthalate, a styrene-acrylonitrile or a thermoplastic material such as polyethylene, polypropylene or polybutylene.

Many clear plastic materials are not as pliable and flexible as required in order to conform to the cable jacket. Therefore, a preferred embodiment of the invention has small, transverse grooves in the fingers that allow the fingers to bend more readily around the cable jacket. In an even more preferred embodiment, the depth of the grooves increases towards the end of the fingers. Shallow transverse grooves are located close to the end wall near the periphery of the aperture and provide a moderate degree of flexibility. As the fingers extend outwardly from the end wall, the grooves are deeper which increases the flexibility of the fingers. The deepest grooves are located near the ends of the fingers to provide maximum flexibility.

In another embodiment, the grooves in the fingers do not increase in depth, but instead the thickness of the fingers decrease as the fingers extend toward their ends. This provides increasing flexibility as the fingers extend from their base towards their ends.

A preferred embodiment of the present invention also includes an internal pocket for holding an identification label which can be read without having to open the cover. Pertinent information identifying the connection and the installation of the closure can be included on the label. This is an advantage over external identification labels presently in use which are more susceptible to being damaged or detached. The identification label is inserted in the internal pocket before the housing is sealed closed.

In another embodiment of the invention, slots are provided on the outside of the cover to allow cable ties to be installed around the covers and complement the cover latches in tightly securing the cover. The slots are located on the side walls of the cover and after the top and bottom sections have been fitted together, the cable ties are passed through the slots and encircle the cover. Preferably, the top and bottom sections have slots at corresponding locations which form mating pairs so that each cable tie passes through a pair of slots. The slots maintain the cable ties in fixed positions so that they are located at fixed intervals along the length of the closure.

Figure 2:
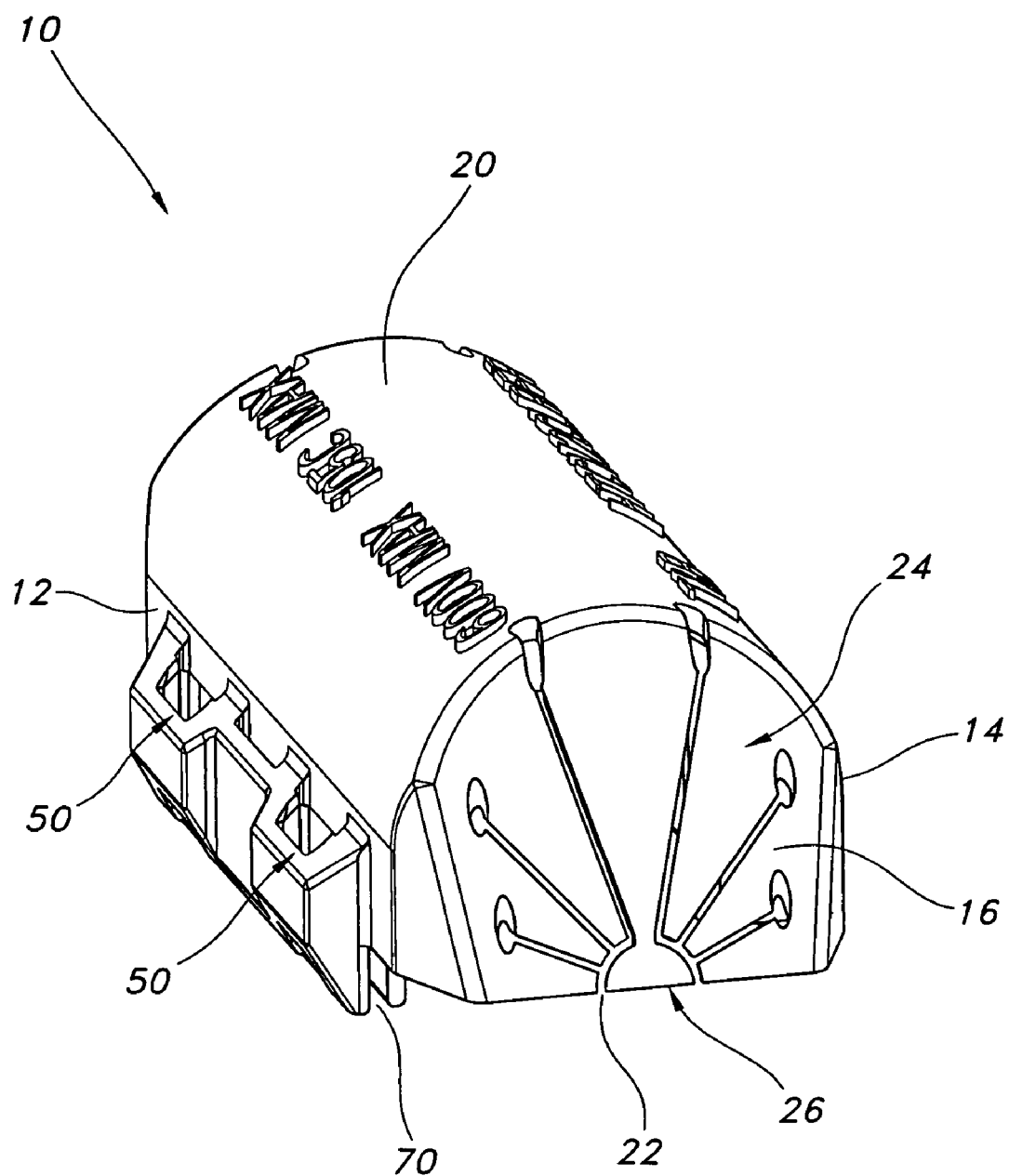
FIG. 2 is a view of the exterior of a top/bottom section of the insulated cover of the present invention.

The different features of the present invention are illustrated in the accompanying drawings. Referring now to FIGS. 1 and 2 which show a preferred embodiment of the insulated cover wherein the top section and the bottom section 10 have the same structure. FIG. 1 shows an internal view of the top/bottom section 10 and FIG. 2 shows an external view of the section 10. The section 10 has opposing side walls 12, 14 and opposing end walls 16, 18 which extend downwardly from the top/bottom wall 20. The end walls 16, 18 include a plurality of flexible fingers 24 which extend inwardly from the periphery and one of the fingers 24 terminates in a semi-circular plug 26. When the semi-circular plug 26 is either pulled back or removed, an aperture 22, 23 is formed in the top/bottom section 10 end wall 16, 18. FIG. 1 shows the internal transverse grooves 28 on the flexible fingers 24 which provide additional flexibility. When the two sections 10 which form the insulated cover are placed around a cable the flexible fingers 24 conform to the shape of the cable.

A pair of slots 50 are attached to the exterior side wall 12 of the section 10 for receiving cable ties (not shown). When two sections 10 are mated together, the pairs of slots 50 on one section 10 align with the slots 50 on the other section 10. FIG. 1 shows the internal label pocket 40 on the interior side of the side wall 14. An identification label (not shown) can be inserted in the label pocket 40 before the two sections 10 of the insulated cover are fitted together.

The side wall 12 (FIG. 1) of one of the sections 10 has a raised portion 60 and the side wall 12 (FIG. 2) of the other section 10 has a recessed portion 70. When the two sections 10 of the insulated cover are mated together, the raised portion 60 of one section 10 engages the corresponding recessed portion 70 of the other section 10. This securely mates the two sections 10 of the closure together.

Figure 3:
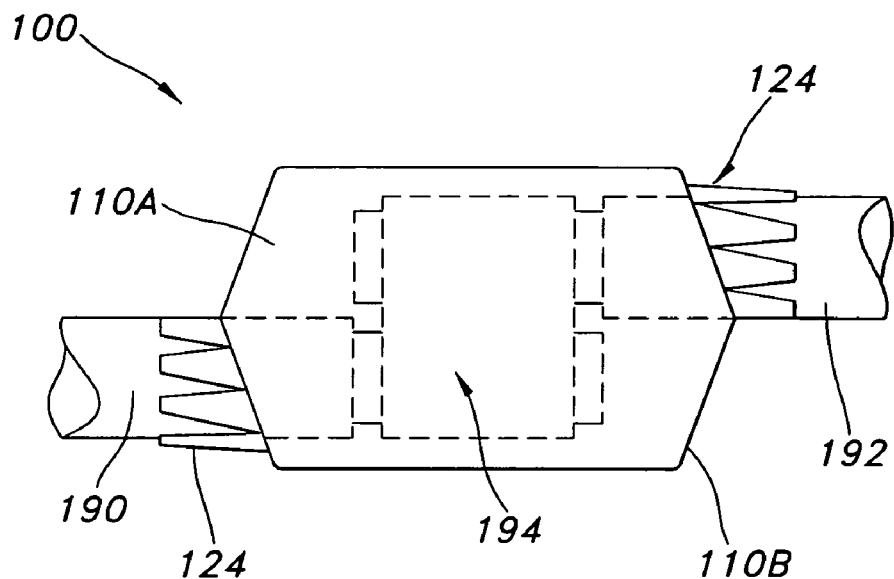
FIG. 3 is a phantom side view of the interior of a insulated cover showing an H-tap connector that connects two cables.

FIG. 3 shows an insulated cover 100, which includes a top section 110A and a bottom section 110B, installed around an H-tap connector 194 that connects two cables 190, 192. The connector 194 is shown in phantom to illustrate how the cables 190, 192 are connected inside the insulated cover 100. The flexible fingers 124 are deflected around the cables 190, 192 to securely enclose the connector 194.

Figure 4:
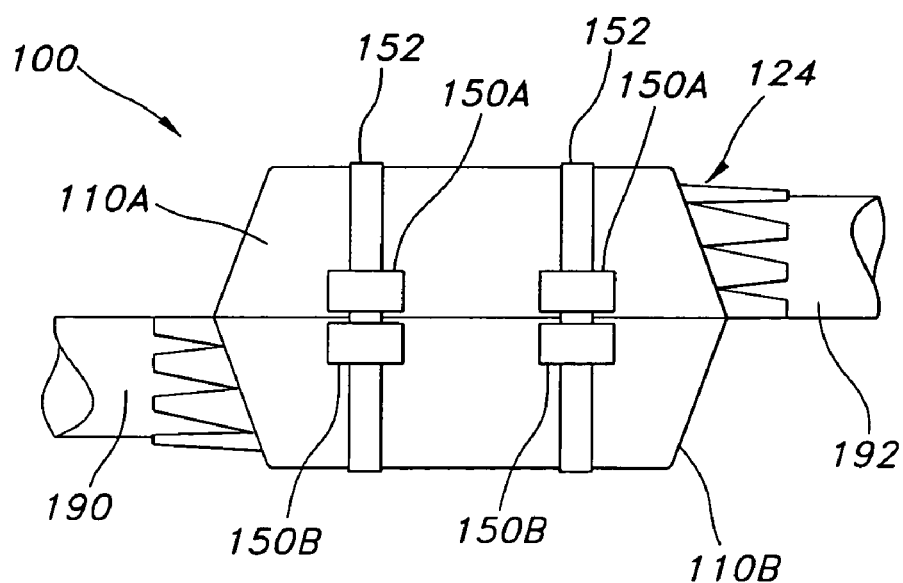
FIG. 4 is side view of a closure showing cable ties encircling the insulated cover and passing through cable tie slots on the side walls of the closure.

FIG. 4 shows an insulated cover 100 with sections 110A and 110B fitted together in the closed position. The slots 150A, 150B for the two sections 110A, 110B are aligned and cable ties 152 encircle the insulated cover 100 and pass through the slots 150A, 150B. This figure shows an embodiment of the invention in which the cables 190, 192 are offset from the center axis of the insulated cover 100 and the flexible fingers 124 are deflected around the cables 190, 192. In preferred embodiments, the cables enter the insulated cover along the longitudinal axis of the cover.

Figure 5:
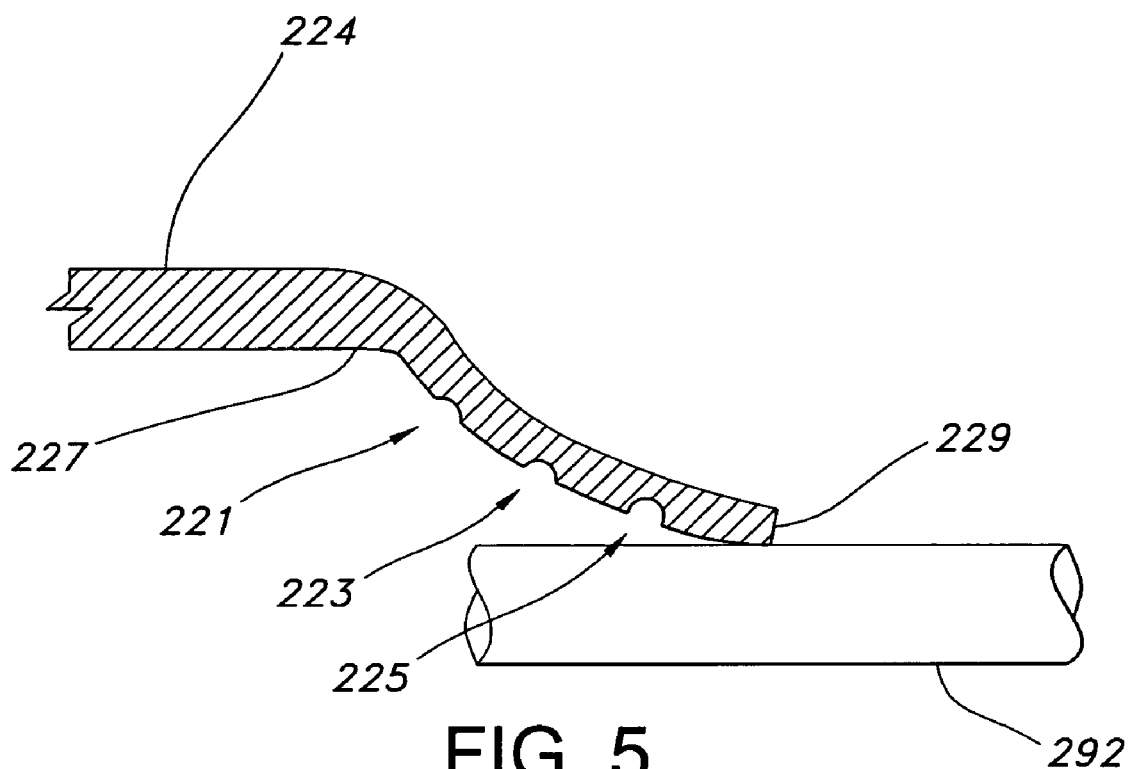
FIG. 5 is a side view of a flexible finger with the size of the transverse grooves increasing as the finger extends outwardly towards the end.

FIG. 5 shows a flexible finger 224 in more detail. Each finger 224 has a plurality of transverse grooves 221, 223, 225 which increase in depth as the finger 224 extends outwardly from its base 227 towards the end 229 so that the groove 221 closest to the base 227 is shallower than the succeeding groove 223, which in turn is shallower than the groove 225 closest to the end 227. When the finger 224 contacts a cable 292, the deeper grooves 225 at the end of the finger 224 are more flexible and provide increased contact between the finger 224 and the cable 292.

Figure 6:
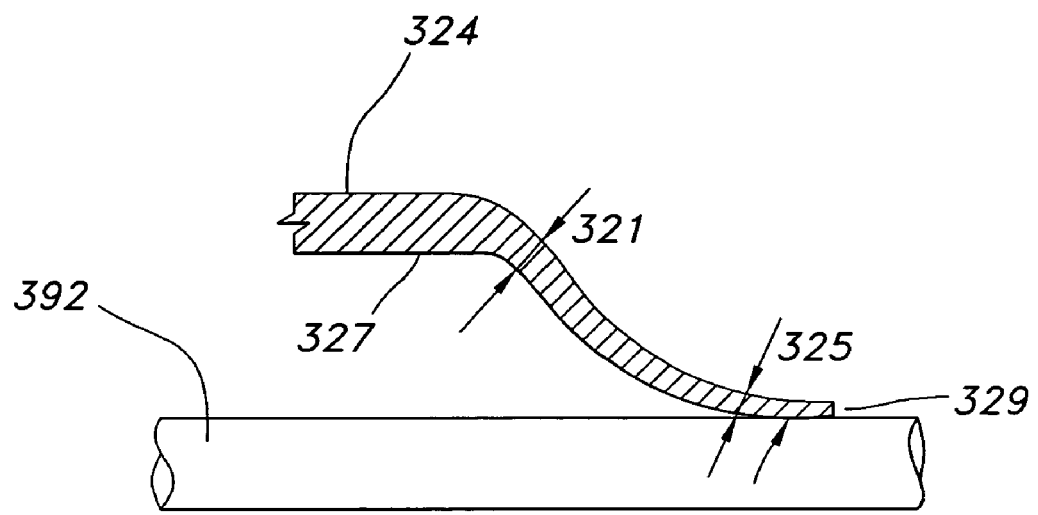
FIG. 6 is a side view of a flexible finger with the thickness of the finger decreasing as the finger extends outwardly towards the end.

FIG. 6 shows a flexible finger 324 having a thickness 321 near its base 327. The thickness of the finger 324 decreases as the finger extends towards the end 329 so that the thickness 325 at the end 329 is between 10–90% of the thickness 321 at the base 327. Preferably, the thickness 325 at the end 329 is between 20–60% of the thickness 321 at the base 327, and most preferably between 30–50%. When the finger 324 contacts a cable 392, the tapered construction of the finger 324 provides increased contact between the finger 324 and the cable 392. In another embodiment (not shown), the fingers have a plurality of grooves and the thickness of the fingers decreases as the finger extends towards the end. In this embodiment, increased flexibility is provided by both the grooves and the decreased thickness of the fingers.

Thus, while there have been described the preferred embodiments of the present invention, those skilled in the art will realize that other embodiments can be made without departing from the spirit of the invention, and it is intended to include all such further modifications and changes as come within the true scope of the claims set forth herein.

We claim:

1. An insulated cover for electrical connectors comprising:
    a transparent housing having an interior surface and an exterior surface and comprising a top section and a bottom section, wherein the top section has a top wall, a pair of opposing top side walls and a pair of opposing top end walls and the bottom section has a bottom wall, a pair of opposing bottom side walls and a pair of opposing bottom end walls, wherein the corresponding top and bottom opposing end walls each form an aperture when the top and bottom sections are joined together; and
    a plurality of flexible fingers extending inwardly from the periphery of each aperture, wherein each finger terminates at an end and has a plurality of transverse grooves, and wherein the grooves in the fingers increase in depth as they approach the end of the fingers and increase the flexibility of the fingers.

2. The insulated cover according to claim 1, wherein one of the fingers extending from each aperture includes a plug at its end.

3. The insulated cover according to claim 1 further comprising a label slot on the interior side of one of the side walls, wherein the slot is configured to receive an identification label.

4. The insulated cover according to claim 1 further comprising at least one cable tie slot on the exterior side of one of the side walls, and wherein the cable tie slots are configured to receive a cable tie.

5. The insulated cover according to claim 1, wherein the housing is formed from a material comprising a thermoplastic material, elastic synthetic polyamide material (Nylon), a polycarbonate, an acrylonitrile-butadiene styrene, a polyester terephthalate or a styrene-acrylonitrile.

6. The insulated cover according to claim 5, wherein the thermoplastic material is a polyethylene, polypropylene or polybutylene.

7. The insulated cover according to claim 1, wherein each finger has a base at the periphery of the aperture with a base thickness and terminates at an end with an end thickness, and wherein the end thickness is between 20–60% of the base thickness.

8. An insulated cover for electrical connectors comprising:
    a transparent housing having a top section and a bottom section which form an interior space when joined together, wherein the top section has a top wall, a pair of opposing top side walls and a pair of opposing top end walls and the bottom section has a bottom wall, a pair of opposing bottom side walls and a pair of opposing bottom end walls;
    a first aperture and a second aperture in the opposing end walls, wherein the first and second apertures are formed when the top section and the bottom section are joined together and wherein each aperture has a periphery;
    a plurality of flexible fingers extending inwardly from the periphery of each aperture, wherein each finger terminates at an end;
    a plurality of transverse grooves on each of the fingers, wherein the grooves in the fingers increase in depth as they approach the end of the fingers, and wherein the grooves increase the flexibility of the fingers;
    a plug at the terminus of one of the fingers;
    a label slot on the interior side of one of the side walls, wherein the slot is configured to receive an identification label; and
    at least one cable tie slot on the side wall of the top section or the bottom section configured to receive a cable tie.

9. The insulated cover according to claim 8, wherein the housing is formed from a material comprising a thermoplastic material, elastic synthetic polyamide material (Nylon), a polycarbonate, an acrylonitrile-butadiene styrene, a polyester terephthalate or a styrene-acrylonitrile.

10. The insulated cover according to claim 9, wherein the thermoplastic material is a polyethylene, polypropylene or polybutylene.

11. The insulated cover according to claim 8, wherein each finger has a base at the periphery of the aperture with a base thickness and terminates at the end with an end thickness, and wherein the end thickness is between 20–60% of the base thickness.

* * * * *